(12) United States Patent
Kuriyama et al.

(10) Patent No.: US 12,297,349 B2
(45) Date of Patent: *May 13, 2025

(54) TRANSPARENT RESIN COMPOSITION AND TRANSPARENT RESIN MOLDED ARTICLE

(71) Applicant: Sony Group Corporation, Tokyo (JP)

(72) Inventors: Akito Kuriyama, Kanagawa (JP); Yasuhito Inagaki, Kanagawa (JP); Takahiro Ohe, Tokyo (JP); Kenji Ueda, Kanagawa (JP); Kohei Shimizu, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,680

(22) Filed: Aug. 24, 2022

(65) Prior Publication Data

US 2022/0403161 A1    Dec. 22, 2022

Related U.S. Application Data

(63) Continuation of application No. 16/337,990, filed as application No. PCT/JP2017/027033 on Jul. 26, 2017, now Pat. No. 11,434,364.

(30) Foreign Application Priority Data

Oct. 6, 2016 (JP) .................. 2016-198311

(51) Int. Cl.
| | |
|---|---|
| *C08L 69/00* | (2006.01) |
| *C08G 64/04* | (2006.01) |
| *C08G 64/18* | (2006.01) |
| *C08K 3/40* | (2006.01) |
| *C08K 5/42* | (2006.01) |
| *C08K 7/20* | (2006.01) |
| *C08L 25/06* | (2006.01) |
| *C08L 27/18* | (2006.01) |
| *C08L 83/04* | (2006.01) |

(52) U.S. Cl.
CPC ............. *C08L 69/00* (2013.01); *C08G 64/04* (2013.01); *C08G 64/186* (2013.01); *C08K 3/40* (2013.01); *C08K 5/42* (2013.01); *C08K 7/20* (2013.01); *C08L 25/06* (2013.01); *C08L 27/18* (2013.01); *C08L 83/04* (2013.01); *C08K 2201/003* (2013.01); *C08L 2201/02* (2013.01); *C08L 2201/10* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 11,434,364 B2 | 9/2022 | Kuriyama et al. | |
| 2007/0181859 A1 | 8/2007 | Inagaki | |
| 2009/0306275 A1 | 12/2009 | Inagaki | |
| 2011/0313110 A1 | 12/2011 | Inagaki | |
| 2012/0217439 A1 | 8/2012 | Higaki et al. | |
| 2013/0066002 A1 | 3/2013 | Kawai | |
| 2015/0210850 A1* | 7/2015 | Yamada | C08L 83/04 524/508 |
| 2015/0218370 A1 | 8/2015 | Ueda et al. | |
| 2017/0327639 A1 | 11/2017 | Sasaki et al. | |
| 2020/0024444 A1 | 1/2020 | Kuriyama et al. | |

FOREIGN PATENT DOCUMENTS

| | | |
|---|---|---|
| CN | 1957037 A | 5/2007 |
| CN | 101602885 A | 12/2009 |
| CN | 101778925 A | 7/2010 |
| CN | 102597111 A | 7/2012 |
| CN | 102906195 A | 1/2013 |
| CN | 104583319 A | 4/2015 |
| EP | 1 728 823 A1 | 12/2006 |
| EP | 2 133 390 A1 | 12/2009 |
| EP | 2 180 033 A1 | 4/2010 |
| EP | 2 497 800 A1 | 9/2012 |
| EP | 2 578 636 A1 | 4/2013 |
| EP | 2 891 682 A1 | 7/2015 |
| JP | 57-024816 B2 | 5/1982 |
| JP | 63-137911 A | 6/1988 |
| JP | 10-046018 A | 2/1998 |
| JP | 2000-169695 A | 6/2000 |
| JP | 02/055604 A1 | 7/2002 |
| JP | 2002-212409 A | 7/2002 |

(Continued)

OTHER PUBLICATIONS

Machine translation of JP 2005272537 (Year: 2005).*
International Search Report and Written Opinion and English translation thereof mailed Oct. 24, 2017 in connection with International Application No. PCT/JP2017/027033.
International Preliminary Report on Patentability and English translation thereof mailed Apr. 18, 2019 in connection with International Application No. PCT/JP2017/027033.
Chinese Office Action issued Nov. 20, 2020 in connection with Chinese Application No. 201780060783.4, and English translation thereof.
Chinese Office Action issued Jul. 14, 2021 in connection with Chinese application No. 201780060783.4, and English translation thereof.

(Continued)

*Primary Examiner* — Robert T Butcher
(74) *Attorney, Agent, or Firm* — Wolf, Greenfield & Sacks, P.C.

(57) ABSTRACT

To provide a transparent resin composition having excellent optical characteristics, particularly, excellent optical characteristics under high temperature and high humidity.
There is provided a transparent resin composition, including: an aromatic polycarbonate resin; and a water-insoluble organic sulfonic acid and/or a metal salt thereof, in which a content of the water-insoluble organic sulfonic acid and/or the metal salt thereof is 0.01 to 3.0 pts·mass to 100 pts·mass of the aromatic polycarbonate resin, and a dissolved amount of the water-insoluble organic sulfonic acid and/or the metal salt thereof is not more than 0.5 g to 100 g of pure water.

22 Claims, No Drawings

(56) References Cited

FOREIGN PATENT DOCUMENTS

| | | |
|---|---|---|
| JP | 02/059205 A1 | 8/2002 |
| JP | 2002-226697 A | 8/2002 |
| JP | 2005-272537 A | 10/2005 |
| JP | 2005-272539 A | 10/2005 |
| JP | 2006-143949 A | 6/2006 |
| JP | 4196861 B2 | 12/2008 |
| JP | 4196862 B2 | 12/2008 |
| JP | 2009-208845 A | 9/2009 |
| JP | 2009-298845 A | 12/2009 |
| JP | 2011-212409 A | 10/2011 |
| JP | 2011-219595 A | 11/2011 |
| JP | 2012-067164 A | 4/2012 |
| JP | 2012-067614 A | 4/2012 |
| JP | 2012-082361 A | 4/2012 |
| JP | 2013-129773 A | 7/2013 |
| JP | 2014-040571 A | 3/2014 |
| JP | 2015-108157 A | 6/2015 |
| JP | 2015-117298 A1 | 6/2015 |
| WO | 2009/025203 A1 | 2/2009 |
| WO | 20 11/149030 A1 | 12/2011 |
| WO | 2014/033987 A1 | 3/2014 |
| WO | 2014/034012 A1 | 3/2014 |

OTHER PUBLICATIONS

Dong X., Modern Plastic Forming Engineering. National Defense Industry Press., p. 60, Sep. 2009.
Wu Z., Polymer Materials Processing Engineering Experimental Tutorial. Chemical Industry Press, pp. 112-113; Sep. 2004.

* cited by examiner

TRANSPARENT RESIN COMPOSITION AND TRANSPARENT RESIN MOLDED ARTICLE

CROSS-REFERENCE TO RELATED APPLICATIONS

The present application claims the benefit under 35 U.S.C. § 120 as a continuation application of U.S. application Ser. No. 16/337,990, filed on Mar. 29, 2019, now U.S. Pat. No. 11,434,364, which claims the benefit under 35 U.S.C. § 371 as a U.S. National Stage Entry of International Application No. PCT/2017/027033, filed in the Japanese Patent Office as a Receiving Office on Jul. 26, 2017, which claims priority to Japanese Patent Application Number JP 2016-198311, filed in the Japanese Patent Office on Oct. 6, 2016, each of which applications is hereby incorporated by reference in its entirety.

TECHNICAL FIELD

The present technology relates to a transparent resin composition and a transparent resin molded article.

BACKGROUND ART

For resin compositions of a lighting apparatus, an indicator light, a fluorescent tube, and the like, a highly transparent material is desired so that the amount of light is not reduced. Further, if a light source is seen through, it is felt dazzling with naked eyes in some cases. In this case, a material for a lighting cover diffused so that the amount of light is not reduced and the light source is not seen through is desired.

In view of the above-mentioned circumferences, for example, a technology relating to a resin composition using a polycarbonate resin has been proposed as disclosed in Patent Literatures 1 to 6.

CITATION LIST

Patent Literature

Patent Literature 1: Japanese Patent Application No. 1982-24816
Patent Literature 2: Japanese Patent Application Laid-open No. 2000-169695
Patent Literature 3: Japanese Patent Application Laid-open No. 1988-137911
Patent Literature 4: Japanese Patent Application Laid-open No. 1998-46018
Patent Literature 5: Japanese Patent Application Laid-open No. 2013-129773
Patent Literature 6: Japanese Patent Application Laid-open No. 2015-108157

DISCLOSURE OF INVENTION

Technical Problem

However, with the technology proposed in Patent Literatures 1 to 6, there is a possibility that further improvement in optical characteristics, particularly, further improvement in optical characteristics under high temperature and high humidity cannot be achieved.

In view of the above, it is a main object of the present technology to provide a transparent resin composition having excellent optical characteristics, particularly, excellent optical characteristics under high temperature and high humidity, and a transparent resin molded article using the transparent resin composition.

Solution to Problem

As a result of extensive research to solve the above-mentioned object, the present inventors have surprisingly succeeded in remarkably improving optical characteristics, particularly, optical characteristics under high temperature and high humidity by using an aromatic polycarbonate resin, a water-insoluble organic sulfonic acid and/or the metal salt thereof in a predetermined amount of composition, and completed the present technology.

That is, in the present technology, first, a transparent resin composition including an aromatic polycarbonate resin; and a water-insoluble organic sulfonic acid and/or the metal salt thereof, in which a content of the water-insoluble organic sulfonic acid and/or the metal salt thereof is 0.01 to 3.0 pts·mass to 100 pts·mass of the aromatic polycarbonate resin, and a dissolved amount of the water-insoluble organic sulfonic acid and/or the metal salt thereof is not more than 0.5 g to 100 g of pure water.

In the transparent resin composition according to the present technology, a rate of decrease of a total light transmittance of the transparent resin composition after an acceleration test under a condition of 120° C., 100%, and 24 hours may be within 10% to a total light transmittance of the transparent resin composition before the acceleration test.

A weight-average molecular weight of the aromatic polycarbonate resin contained in the transparent resin composition according to the present technology in terms of polystyrene may be 36,000 or more and 63,000 or less.

The metal salt of the water-insoluble organic sulfonic acid contained in the transparent resin composition according to the present technology may include an aromatic sulfonic acid metal salt compound.

A weight-average molecular weight of the aromatic sulfonic acid metal salt compound in terms of polystyrene may be not less than 30,000.

The aromatic sulfonic acid metal salt compound may include a sulfonic acid metal base, and a content of the sulfonic acid metal base may be 0.1 to 10 mol %.

The aromatic polycarbonate resin contained in the transparent resin composition according to the present technology may include a recovered polycarbonate resin, and a content of the recovered polycarbonate resin may be from 1 to less than 100 mass % to the total mass of the aromatic polycarbonate resin.

The aromatic polycarbonate resin may include a recovered polycarbonate resin.

The aromatic polycarbonate resin may include an aromatic polycarbonate compound having 0.01 to 3.0 mol % branch structure.

The aromatic polycarbonate resin may include an aromatic polycarbonate-polyorganosiloxane copolymer.

The transparent resin composition according to the present technology may further include a light diffusing agent.

the light diffusing agent contained in the transparent resin composition according to the present technology may be an inorganic particle or an organic particle, and an average particle diameter of the inorganic particle or the organic particle may be 0.1 to 50 μm.

In the transparent resin composition that further contains the light diffusing agent according to the present technology, a rate of decrease of a total light transmittance of the transparent resin composition after an acceleration test under a condition of 120° C., 100%, and 24 hours may be within 10% to a total light transmittance of the transparent resin composition before the acceleration test.

In the transparent resin composition according to the present technology, a content of the light diffusing agent may be 0.0005 to 6.0 pts·mass to 100 pts·mass of the aromatic polycarbonate resin.

The transparent resin composition according to the present technology may further include a drip preventing agent, in which a content of the drip preventing agent may be not more than 0.03 pts·mass to 100 pts·mass of the aromatic polycarbonate resin.

Further, in the present technology, a transparent resin molded article that is obtained by molding the transparent resin composition according to the present technology is provided.

The transparent resin molded article according to the present technology may be a cover for lighting apparatus. The transparent resin molded article according to the present technology may be a diffusing cover for lighting apparatus for display.

Advantageous Effects of Invention

In accordance with the present technology, it is possible to improve optical characteristics, particularly, optical characteristics under high temperature and high humidity. It should be noted that the effect described here is not necessarily limitative and may be any effect described in the present technology.

MODE(S) FOR CARRYING OUT THE INVENTION

Hereinafter, favorable embodiments for carrying out the present technology will be described. The embodiments described below shows an example of a representative embodiment of the present technology so that the scope of the present technology is not narrowly interpreted.

Note that description will be made in the following order.
1. Overview of Present Technology
2. First Embodiment (Example of Transparent Resin Composition)
   2-1. Transparent Resin Composition
   2-2. Aromatic Polycarbonate Resin
   2-3. Water-Insoluble Organic Sulfonic Acid and/or Metal Salt of Water-Insoluble Sulfonic Acid
   2-4. Light Diffusing Agent
   2-5. Drip Preventing Agent
   2-6. Other Components
   2-7. Method of Producing Transparent Resin Composition
3. Second Embodiment (Example of Transparent Resin Molded Article)
   3-1. Transparent Resin Molded Article
   3-2. Method of Producing Transparent Resin Molded Article 1. Overview of Present Technology First, an overview of the present technology will be described.

The present technology relates to a lighting apparatus, particularly, a polycarbonate resin composition for lighting, which used for an LED lamp or the like. More specifically, the present technology relates to a polycarbonate resin composition for high endurance lighting, which is capable of improving the flame retardancy without containing a halogen flame retardant or a phosphorus flame retardant such as chlorine and bromine compounds and maintaining excellent optical characteristics such as high transparency for a long time even in harsh environment (e.g., hot and humid areas) without impairing the performance such as mechanical properties including excellent impact resistance the aromatic polycarbonate resin originally has, and fluidity. Further, the present technology relates to a transparent resin molded article using the transparent resin composition.

The "transparency" described in the present technology defines not less than 75% of total light transmittance at the wavelength of 380 to 730 nm in the JIS K7136 standard. When the total light transmittance is less than 75%, a decrease in visibility occurs. Therefore, the "transparent" represents not less than 75% of total light transmittance, which is favorably not less than 80%, and more favorably not less than 85%.

In the past, transparent glass has been used for a transparent material of a lighting cover, and frosted glass or an opaque white vinyl chloride resin has been used for a diffusion material of the lighting cover. The glass material has handling problems and a problem that it is relatively heavy. In order to improve these problems, a synthetic resin lighting cover has also been used. Further, in recent years, an LED lighting apparatus has been progressively developed by appearance of a high luminance white LED. The LED lighting apparatus is greatly expected as a next generation lighting apparatus due to characteristics such as high luminance, long life, and energy saving of the LED light source.

Although the LED lighting apparatus has attracted attention as a next generation lighting apparatus due to characteristics such as high luminance, long life, and energy saving, a resin composition that takes advantage of the long life in high temperature and high humidity areas has not yet been developed.

Under the circumstances as described above, the present technology has been made as a result of extensive research by the present inventors. In accordance with the present technology, by adding a water-insoluble organic sulfonic acid and/or the metal salt thereof, the effects of excellent optical characteristics, particularly, the effects of excellent optical characteristics and durability under high temperature and high humidity are exerted, and the effect of the flame retardancy is exerted as well. Further, since a recovered polycarbonate resin of a waste optical disk or the like can be effectively used as a raw material, the present technology is capable of contributing to resource saving of a polycarbonate resin such as an aromatic polycarbonate resin.

2. First Embodiment (Example of Transparent Resin Composition)

2-1. Transparent Resin Composition

Hereinafter, a transparent resin composition according to a first embodiment of the present technology will be described in detail.

A transparent resin composition according to the first embodiment of the present technology contains an aromatic polycarbonate resin; and a water-insoluble organic sulfonic acid and/or a metal salt thereof, in which a content of the water-insoluble organic sulfonic acid and/or the metal salt thereof is 0.01 to 3.0 pts·mass to 100 pts·mass of the aromatic polycarbonate resin, and a dissolved amount of the water-insoluble organic sulfonic acid and/or the metal salt thereof is not more than 0.5 g to pure water 100 g.

In accordance with the transparent resin composition according to the first embodiment of the present technology, the effects of excellent optical characteristics, particularly, the effects of excellent optical characteristics under high temperature and high humidity are exerted. More specifically, the transparent resin composition according to the first embodiment of the present technology has excellent high light transmittance, and excellent durability such that the light transmittance is not reduced also under high temperature and high humidity and high light transmittance can be maintained. Further, since the transparent resin composition according to the first embodiment of the present technology has excellent flame retardancy while using excellent optical characteristics, it is possible to achieve both the excellent optical characteristics and the excellent flame retardancy.

Then, the transparent resin composition according to the first embodiment of the present technology has light transmittance and high durability such that the flame retardancy is not reduced particularly under high temperature and high humidity, and can be favorably used as a resin composition for lighting of an illumination light, an indicator light, a fluorescent tube, a lighting dome, an arcade, a road side wall plate. In particular, it is favorably used for a lighting apparatus using an LED light source.

In the transparent resin composition according to the first embodiment of the present technology, a rate of decrease of a total light transmittance of the transparent resin composition after an acceleration test under a condition of 120° C., 100%, and 24 hours, which is one of high temperature and high humidity conditions, is favorably within 10%, more favorably within 8%, to a total light transmittance of the transparent resin composition before the acceleration test.

Then, the transparent resin composition according to the first embodiment of the present technology favorably has not less than 75% of a total light transmittance when the thickness of the transparent resin composition is approximately 1 mm.

2-2. Aromatic Polycarbonate Resin

The transparent resin composition of the first embodiment according to the present technology includes an aromatic polycarbonate resin. The aromatic polycarbonate resin may have a molecular weight of an arbitrary value, but the molecular weight favorably has a weight-average molecular weight (in terms of polystyrene) of 36,000 to 63,000.

The aromatic polycarbonate resin having the weight-average molecular weight (in terms of polystyrene) of 36,000 to 63,000 (which may be a composite of polycarbonate resins having different weight-average molecular weights, but a weight-average molecular weight of the composite is an arithmetic mean of the weight-average molecular weights) is used as a material for producing a transparent resin composition of the first embodiment according to the present technology or a molding-processed product of a flame-retardant polycarbonate resin, and is used for use applications of a casing material of an optical disc or a home electrical appliance. In general, an aromatic polycarbonate resin produced by the reaction between a dihydric phenol and a carbonate precursor can be used. Examples of the reaction method include interfacial polymerization, melt transesterification, solid-phase transesterification of carbonate prepolymer, and ring-opening polymerization of a cyclic carbonate compound. Those dihydric phenol and carbonate precursor are not particularly limited, and various materials can be used.

The aromatic polycarbonate resin may be polyester carbonate obtained by copolymerizing an aromatic dicarboxylic acid, for example, a terephthalic acid, an isophthalic acid, a naphthalenedicarboxylic acid, or a derivative thereof without impairing the gist of the present technology. Further, in order to improve the mechanical property, chemical property, or electrical property of a lighting cover, other thermoplastic resins other than the A component can be blended as long as the optical properties/characteristics are not impaired. The blending amount of other thermoplastic resins varies depending on the type and aim thereof, but generally, is favorably 1 to 30 pts·mass and more favorably 2 to 20 pts·mass per 100 pts·mass of the aromatic polycarbonate resin. Examples of other thermoplastic resins include commodity plastics typified by a polyethylene resin, a polypropylene resin, a polyalkylmethacrylate resin, and the like, engineering plastics typified by a polyphenylene ether resin, a polyacetal resin, a polyamide resin, a cyclic polyolefin resin, a polyarylate resin (amorphous polyarylate, liquid-crystal polyarylate), and the like, and so-called super engineering plastics including polyetheretherketone, polyether-imide, polysulfone, polyethersulfone, polyphenylene-sulfide, and the like. Furthermore, thermoplastic elastomers such as an olefin-based thermoplastic elastomer, a polyamide-based thermoplastic elastomer, and a polyurethane-based thermoplastic elastomer can also be used.

(Aromatic Polycarbonate Resin Having Branching Structure)

The aromatic polycarbonate resin included in the transparent resin composition of the first embodiment according to the present technology favorably includes an aromatic polycarbonate resin having a branching structure (which may also be referred to as branched aromatic polycarbonate resin).

The branched aromatic polycarbonate (PC) resin is not particularly limited as long as it is a branched aromatic polycarbonate resin. Examples of the branched aromatic polycarbonate resin include a branched aromatic polycarbonate, which has a branched core structure derived from the branching agent represented by the following general formula (I) and has a viscosity-average molecular weight of 15,000 to 40,000, favorably 17,000 to 30,000, and more favorably 17,000 to 27,000, and in which the usage of the branching agent favorably is within the range of 0.01 to 3 mol %, and more favorably 0.1 to 2.0 mol %, to a dihydric phenol compound.

[Chemical 1]

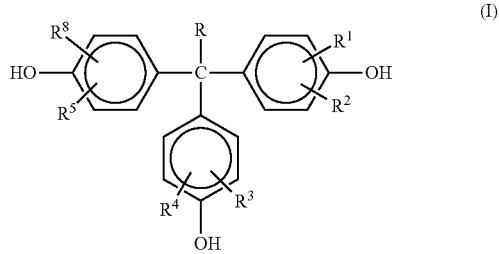

(I)

R represents hydrogen or an alkyl group having 1 to 5 carbon atoms, for example, a methyl group, an ethyl group, an n-propyl group, an n-butyl group, or an n-pentyl group. Further, R1 to R6 each independently represent hydrogen, an alkyl group having 1 to 5 carbon atoms (for example, methyl group, ethyl group, n-propyl group, n-butyl group, n-pentyl group, or the like), or an halogen atom (for example, chlorine atom, bromine atom, or fluorine atom).

More specifically, the branching agent represented by the general formula (I) is, for example, a compound including three or more functional groups, such as 1,1,1-tris(4-hydroxyphenyl)-methane; 1,1,1-tris(4-hydroxyphenyl)-ethane; 1,1,1-tris(4-hydroxyphenyl)-propane; 1,1,1-tris(2-methyl-4-hydroxyphenyl)-methane; 1,1,1-tris(2-methyl-4-hydroxyphenyl)-ethane; 1,1,1-tris(3-methyl-4-hydroxyphenyl)-methane; 1,1,1-tris(3-methyl-4-hydroxyphenyl)-ethane; 1,1,1-tris(3,5-dimethyl-4-hydroxyphenyl)-methane; 1,1,1-tris(3,5-dimethyl-4-hydroxyphenyl)-ethane; 1,1,1-tris(3-chloro-4-hydroxyphenyl)-methane; 1,1,1-tris(3-chloro-4-hydroxyphenyl)-ethane; 1,1,1-tris(3,5-dichloro-4-hydroxyphenyl)-methane; 1,1,1-tris(3,5-dichloro-4-hydroxyphenyl)-ethane; 1,1,1-tris(3-bromo-4-hydroxyphenyl)-methane; 1,1,1-tris(3-bromo-4-hydroxyphenyl)-ethane; 1,1,1-tris(3,5-dibromo-4-hydroxyphenyl)-methane; 1,1,1-tris(3,5-dibromo-4-hydroxyphenyl)-ethane, 4,4'-(1-[4-[1-[4-hydroxyphenyl)-1-methylethyl]phenyl]ethylidene]bisphenol; α,α',α"-tris(4-hydroxyphenyl)-1,3,5-triisopropylbenzene; 1-[α-methyl-α-(4'-hydroxyphenyl)ethyl]-4-[α',α'-bis(4"-hydroxyphenyl) ethyl]benzene; phloroglucin, trimellitic acid, or isatinbis(o-cresol). Of those, 1,1,1-tris(4-hydroxyphenyl)ethane is favorably used from the viewpoints of availability, reactivity, and economic efficiency.

Each of those branching agents may be used alone, or two or more kinds thereof may be used as a mixture. Further, when 1,1,1-tris(4-hydroxyphenyl)ethane is used as a branching agent, the usage thereof may be favorably 0.2 to 2.0 mol %, more favorably 0.3 to 2.0 mol %, still more favorably 0.4 to 1.9 mol % with respect to the dihydric phenol compound. When the usage is 0.2 mol % or more, the degree of freedom in blending increases. With the usage is 2.0 mol % or less, gelation hardly occurs during polymerization and hence the polycarbonate is easily produced.

The branched aromatic polycarbonate resin has a branched core structure derived from the branching agent represented by the general formula (I) described above and is specifically represented by the following formula.

[Chemical 2]

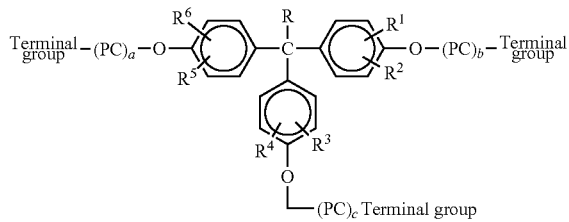

Here, in the formula, a, b, and c each represent an integer, and PC represents a polycarbonate moiety.

For example, when bisphenol A is used as a raw material component, PC represents a repeating unit represented by the following formula.

[Chemical 3]

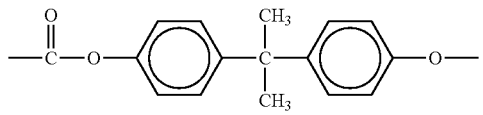

The amount (ratio) of the branched aromatic polycarbonate resin in 100 pts·mass of the aromatic polycarbonate resin is favorably 10 to 100 pts·mass, more favorably 50 to 100 pts·mass. An effect of thin-wall flame retardancy may not be obtained unless the amount of the branched aromatic polycarbonate resin is 10 pts·mass or more.

(Aromatic Polycarbonate-Polyorganosiloxane Copolymer)

The aromatic polycarbonate resin included in the transparent resin composition of the first embodiment according to the present technology favorably includes an aromatic polycarbonate-polyorganosiloxane copolymer.

The aromatic polycarbonate-polyorganosiloxane copolymer includes an aromatic polycarbonate moiety and a polyorganosiloxane moiety and includes an aromatic polycarbonate structural unit represented by the following general formula (V) and a polyorganosiloxane structural unit represented by the following general formula (VI).

[Chemical 4]

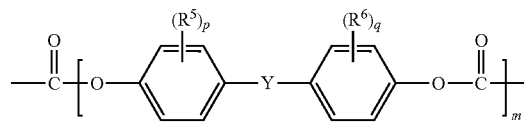

In the formula (V), $R^5$ and $R^6$ each represent a halogen atom, an alkyl group having 1 to 6 carbon atoms (favorably having 1 to 4 carbon atoms), or a phenyl group that may include a substituent, and when a plurality of R5 and R6 exist, the R5 and R6 may be identical or different from each other. Y represents a single bond, an alkylene group or alkylidene group having 1 to 20 carbon atoms (favorably having 2 to 10 carbon atoms), a cycloalkylene group or cycloalkylidene group having 5 to 20 carbon atoms (favorably having 5 to 12 carbon atoms), or an —O—, —S—, —SO—, —SO$_2$—, or —CO-bond, favorably isopropylidene group. p and q each represent an integer of 0 to 4 (favorably 0), and when a plurality of p and q exist, the p and q may be identical or different from each other. m represents an integer of 1 to 100 (favorably integer of 5 to 90). When m is 1 to 100, an appropriate viscosity-average molecular weight is obtained in the aromatic polycarbonate-polyorganosiloxane copolymer accordingly.

[Chemical 5]

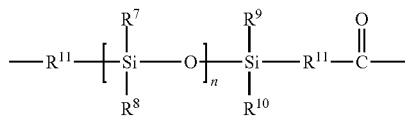

In the formula (VI), $R^7$ to $R^{10}$ each represent an alkyl group having 1 to 6 carbon atoms or a phenyl group that may include a substituent, and the $R^7$ to $R^{10}$ may be identical or different from each other. Specific examples of the $R^7$ to $R^{10}$ include an alkyl group such as a methyl group, an ethyl group, a propyl group, an n-butyl group, an isobutyl group, an amyl group, an isoamyl group, and a hexyl group and phenyl-based allyl such as a phenyl group, a tolyl group, a xylyl group, and a naphthyl group. $R^{11}$ represents an organic residue including fatty series and aromatic series, favorably a divalent organic compound residue such as an o-allyl phenol residue, a p-hydroxystyrene residue, and an eugenol residue.

As a manufacturing method of the aromatic polycarbonate-polyorganosiloxane copolymer, for example, aromatic polycarbonate oligomer and polyorganosiloxane having a reactive group at a terminal of a polyorganosiloxane part are dissolved into solvent such as methylene chloride, a catalyst such as triethylamine is used, dihydric phenol such as bisphenol A is added, and interfacial polycondensation reaction is performed. The aromatic polycarbonate-polyorganosiloxane copolymer is thereby manufactured. The aromatic polycarbonate-polyorganosiloxane copolymer is disclosed in, for example, Japanese Patent Application Laid-open No. H3-292359, Japanese Patent Application Laid-open No. H4-202465, Japanese Patent Application Laid-open No. H8-81620, Japanese Patent Application Laid-open No. H8-302178, Japanese Patent Application Laid-open No. H10-7897, and the like.

The polymerization degree of a structural unit of aromatic polycarbonate of aromatic polycarbonate-polyorganosiloxane copolymer is favorably 3 to 100. The polymerization degree of a structural unit of polyorganosiloxane is favorably approximately 2 to 500, more favorably approximately 2 to 300, and furthermore favorably approximately 2 to 140. Such aromatic polycarbonate-polyorganosiloxane copolymer is used. Further, the content of polyorganosiloxane of aromatic polycarbonate-polyorganosiloxane copolymer is generally in a range of approximately 0.1 to 10 mass %, and favorably 0.3 to 6 mass %. The viscosity-average molecular weight of aromatic polycarbonate-polyorganosiloxane copolymer used in a transparent resin composition of the first embodiment according to the present technology is generally approximately 5,000 to 100,000, favorably 10,000 to 30,000, and particularly favorably 12,000 to 30,000. Here, the viscosity-average molecular weight (Mv) of each of them may be obtained in a similar way to that of the polycarbonate resin.

(Recovered Polycarbonate Resin)

The aforementioned aromatic polycarbonate resin may be favorably a newly manufactured virgin material, may be favorably a waste material, a leftover material, a sprue material, a scrap, or the like generated in a manufacturing process, or may be favorably a recovered material or a waste material of a product (for example, optical disk (substrate) such as digital versatile disk (DVD), compact disk (CD), MO, MD, or Blu-ray disk (BD)).

In other words, aromatic polycarbonate resin may include favorably a recovered polycarbonate resin in the range from 1 to less than 100 mass %, or may be favorably a recovered polycarbonate resin (100 mass %).

In a case that a recovered optical disk is used, it has various attached materials such as a metal reflecting layer, a plating layer, a recording material layer, an adhesive layer, or a label. However, according to the present invention, a recovered optical disk having such attached materials may be used as it is. Alternatively, such impurities and additional materials may be separated and removed from a recovered optical disk by using a known method, and the resultant material may be used.

Specific examples include a metal reflecting layer such as Al, Au, Ag, or Si, a recording material layer such as an organic pigment containing a cyanine series pigment, Te, Se, S, Ge, In, Sb, Fe, Tb, Co, Ag, Ce, or Bi, an adhesive layer including at least one kind or more of acrylic series acrylate, ether series acrylate, or vinyl series monomer, oligomer, or polymer, a label ink layer containing at least one kind of ultraviolet ray curable monomer, oligomer, or polymer, and polymerization initiator, colorant, or an adjuvant, and the like. The specific examples are not limited to them. The specific examples may include a film forming material and a coating material generally used in an optical disk. Note that, from a viewpoint of recycling, it is desirable to use a low-cost raw material. So it is preferable to reuse a resin containing impurities of various materials as it is. For example, optical disks are crushed minutely, optionally mixed with a predetermined additive material, and melted, and pellets are thereby manufactured. The pellets may be used as a PC resin raw material (A component). Alternatively, depending on the structure of an injection molding device, recovered disks and various additive agents (described later) may be directly input together in a hopper or the like of the injection molding device, and a molded article made of a resin composition may be obtained. Note that, in a case that a PC resin (A component) without the aforementioned various impurities is used, attached materials such as a metal reflecting layer, a recording material layer, an adhesive layer, a surface-hardened layer, or a label may be removed by using a mechanical or chemical method disclosed in, for example, Japanese Patent Application Laid-open No. H6-223416, Japanese Patent Application Laid-open No. H10-269634, Japanese Patent Application Laid-open No. H10-249315, or the like.

By the way, the weight-average molecular weight of aromatic polycarbonate resin may be measured in terms of polystyrene by using a polystyrene molecular weight standard substance (sample) as a standard, by means of GPC (Gel Permeation Chromatography) measurement using chloroform solvent.

The molecular weight of aromatic polycarbonate resin may be an arbitrary value. However, the molecular weight of aromatic polycarbonate resin may be favorably 36000 to 63000 in weight-average molecular weight (in terms of polystyrene). The reason is as follows. If the weight-average molecular weight of aromatic polycarbonate resin is larger than 63000, the flowability (workability) of a melted flame-resistant resin composition, i.e., a resultant material, may sometimes tend to decrease. On the other hand, if the weight-average molecular weight of aromatic polycarbonate resin is smaller than 36000, the solvent resistance decreases, solvent cracks (cracks with chemical agent) may tend to occur sometimes, and the resistance to shock may tend to decrease sometimes.

From viewpoints of mechanical strength and moldability, the weight-average molecular weight of an aromatic polycarbonate resin contained in a transparent resin composition is more favorably 40000 to 59000, and furthermore favorably 44000 to 54000.

2-3. Water-Insoluble Organic Sulfonic Acid and/or Metal Salt of Water-Insoluble Organic Sulfonic Acid The transparent resin composition according to the first embodiment of the present technology contains the water-insoluble organic sulfonic acid and/or the metal salt thereof. The water-insoluble organic sulfonic acid and/or the metal salt thereof is not bleed out to the surface of the transparent resin composition, and do not cause surface deterioration, resulting in improvement of transparency. Further, the water-insoluble organic sulfonic acid and/or the metal salt thereof does not cause problems such as corrosion of a molding machine screw or a product mold during injection molding. Further, since it has excellent heat resistance and excellent impact resistance as compared with a phosphorus flame retardant, it is effectively used from the viewpoint of physical properties and environment.

The content of the water-insoluble organic sulfonic acid and/or the metal salt thereof is 0.01 to 3.0 pts·mass to 100 pts·mass of the aromatic polycarbonate resin. The dissolved amount of the water-insoluble organic sulfonic acid and/or the metal salt thereof is not more than 0.5 g to 100 g of pure water. The dissolved amount per 100 g of pure water can be calculated by mixing 3 g of sample with 100 g of pure water, stirring for 30 minutes, and then filtering it with 0.5 μm filter to measure the insoluble matter.

The water-insoluble organic sulfonic acid is not particularly limited as long as it is water-insoluble and an organic sulfonic acid. Further, the metal salt of the water-insoluble organic sulfonic acid is not particularly limited as long as it is water-insoluble and a metal salt of an organic sulfonic acid. However, it is favorably an aromatic sulfonic acid metal salt compound. The aromatic sulfonic acid metal salt compound contains a sulfonic acid metal base, and the content of the sulfonic acid metal base may be appropriately adjusted to an arbitrary amount. The content is favorably 0.1 to 10 mol %. In the water-insoluble organic sulfonic acid or the metal salt of the water-insoluble organic sulfonic acid, examples of a low molecular weight compound include a perfluoroalkanesulfonic acid, an alkylbenzene sulfonic acid, a halogenated alkylbenzene sulfonic acid, an alkylsulfonic acid, a naphthalenesulfonic acid, and alkali metal salts or alkaline earth metal salts thereof, and examples of a high molecular weight compound include those having a predetermined amount of a sulfonic acid and/or a metal salt thereof in a polymer having an aromatic ring described in Japanese Patent No. 4196862 and Japanese Patent No. 4196861. Examples of the polymer having an aromatic ring include a polystyrene (PS) sulfonic acid or a metal salt of a polystyrene (PS) sulfonic acid, a high impact polystyrene (HIPS) sulfonic acid or a metal salt of a high impact polystyrene (HIPS) sulfonic acid, and a sulfonic acid group and/or a styrene-acrylonitrile copolymer resin (AS) containing a sulfonic acid group.

As the water-insoluble organic sulfonic acid or the metal salt of the water-insoluble organic sulfonic acid, as described above, there are various kinds from those having a low molecular weight to those having a high molecular weight. However, in general, those having a low molecular weight area favorable from the viewpoint of good dispersibility when being knead in an aromatic polycarbonate resin and excellent storage stability under high temperature and high humidity conditions.

A core-shell styrene polymer in which a sulfonic acid group is bonded to a particle surface layer portion, and an alkali metal salt or alkaline earth metal salt thereof are further favorable. Specific examples thereof include a polystyrene sulfonic acid and a potassium salt thereof. One or more selected from these may be mixed and used at an appropriate ratio. However, it is favorable to use a polystyrene sulfonic acid or a potassium salt thereof because a high flame retardant effect can be achieved with a very small addition amount. Further, an average molecular weight thereof (in terms of polystyrene) is favorably not less than 30,000, and more favorably not less than 40,000 and not more than 300,000 because the balance between solvent resistance and compatibility is further maintained.

The content of the water-insoluble organic sulfonic acid and/or the metal salt thereof is 0.01 to 3.0 pts·mass to 100 pts·mass of the aromatic polycarbonate resin, as described above. However, when it is 0.05 to 1.5 pts·mass, the flame retardant effect is further strengthened. More favorably, it is 0.05 to 1 pts·mass because further stronger flame retardant effect can be achieved. When it is less than 0.05 pts·mass, the flame retardant effect is hard to achieve in some cases. Further, when it exceeds 1.5 pts·mass, the compatibility with the aromatic polycarbonate resin is reduced in some cases, and there may be a negative flame retardant effect, i.e., the flame retardant level may be lower than that in the case of not containing it.

2-4. Light Diffusing Agent

It is favorable that the transparent resin composition according to the first embodiment of the present technology further contains a light diffusing agent. In the transparent resin composition according to the first embodiment of the present technology that further contains a light diffusing agent, the rate of decrease of the total light transmittance of the transparent resin composition after an acceleration test under a condition of 120° C., 100%, and 24 hours, which is one of high temperature and high humidity conditions, is favorably within 10%, more favorably within 8%, to the total light transmittance of the transparent resin composition before the acceleration test.

The light diffusing agent is favorably a particulate inorganic or organic particle. Examples thereof include an organic fine particle such as a glass fine particle, a polystyrene resin, a (meth) acryl resin, and a silicone resin. The organic fine particle is favorable, and the fine particle favorably has a spherical shape in view of the light diffusion effect. The average particle size of the particulate light diffusing agent is favorably 0.1 to 50 μm, more favorably 0.5 to 30 μm, and further favorably 1 to 20 μm.

As such an organic fine particle, a crosslinked organic fine particle that does not melt in a polycarbonate resin even when it is heated to the molding temperature of the polycarbonate resin is favorable. Specific examples thereof include a crosslinked organic fine particle of a (meth) acryl resin and silicone resin. Specific examples thereof include a polymer fine particle of partially crosslinked polymethylmethacrylate, a crosslinked silicone resin particle, and a silicone rubber powder obtained by covering silicone rubber with a silicone resin.

The content of the light diffusing agent is favorably 0.0005 to 6.0 pts·mass, more favorably 0.05 to 3.0 pts·mass, and further favorably 0.1 to 2 pts·mass, to 100 pts·mass of the aromatic polycarbonate resin. In the case where the formulation ratio of the light diffusing agent less than 0.01 pts·mass, the light diffusibility is insufficient in some cases, the LED light source having high luminance is easily seen through in some cases, and the dazzle reduction effect is insufficient in some cases. In the case where the formulation amount of the light diffusing agent exceeds 6.0 pts·mass, necessary illumination luminance cannot be achieved in some cases.

2-5. Drip Preventing Agent

The transparent resin composition according to the first embodiment of the present technology may further contain a drip preventing agent. The content of the drip preventing agent may be not more than 0.03 pts·mass to 100 pts·mass of the aromatic polycarbonate resin. The drip preventing agent is capable of suppressing the dripping phenomenon at the time of combustion. Examples of the drip preventing agent include a fluoroolefin resin.

Examples of the fluoroolefin resin include a difluoroethylene polymer, a tetrafluoroethylene polymer, a tetrafluoroethylene-hexafluoropropylene copolymer, and a copolymer of tetrafluoroethylene and an ethylene monomer. Any one or more of them can be used in combination.

Among these fluoroolefin resins, particularly, it is favorable to use a tetrafluoroethylene polymer or the like. The average molecular weight is not less than 50,000, and favorably in the range of 100,000 to 20,000,000. Note that as the fluoroolefin resin, one having fibril-forming ability is more favorable.

The content of the drip preventing agent such as a fluoroolefin resin only needs to be not more than 0.03 pts·mass as described above, favorably in the range of 0.001 to 0.03 pts·mass, more favorably in the range of 0.005 to 0.02 pts·mass, and further favorably in the range of 0.01 to 0.02 pts·mass, to 100 pts·mass of the aromatic polycarbonate resin.

In the case where the content of the drip preventing agent such as a fluoroolefin resin is less than 0.001 pts·mass to 100 pts·mass of the aromatic polycarbonate resin, it is difficult to suppress the dripping phenomenon in some cases. Meanwhile, in the case where the content of the drip preventing agent such as a fluoroolefin resin exceeds 0.03 pts·mass, the molded product remarkably whitens and the transparency thereof is impaired, which makes it unsuitable as a resin composition for lighting in some cases.

2-6. Other Components

The transparent resin composition according to the first embodiment of the present technology may contain, as other components (other additives), an antioxidant (hindered phenol type, phosphorus type, or sulfur type), an antistatic agent, a UV absorbing agent (benzophenone type, benzotriazole type, hydroxyphenyl triazine type, cyclic imino ester type, or cyanoacrylate type), a light stabilizer, a plasticizer, a compatibilizer, a colorant (pigment, dye), a light stabilizer, a crystal nucleating agent, an antimicrobial agent, a flow modifier, an infrared absorbing agent, a phosphor, a hydrolysis inhibitor, a release agent, a silicone flame retardant, a silicone surface treatment agent, or the like, in addition to the aromatic polycarbonate resin and the water-insoluble organic sulfonic acid and/or the metal salt thereof. As a result, the injection moldability, impact resistance, appearance, heat resistance, weather resistance, color, rigidity, and the like are improved. In particular, examples of the silicone flame retardant include the following silicone compounds.

The silicone compound is used for imparting flame retardancy to the transparent resin composition. The addition amount of the silicone flame retardant in the transparent resin composition is favorably 0.001 to 0.02 (0.1 to 2 mass %) in terms of mass ratio to the transparent resin composition. In the case where the addition amount of the silicone flame retardant is less than 0.001 (0.1 mass %) in terms of mass ratio to the transparent resin composition, the effect of imparting flame retardancy to the transparent resin composition is not sufficient in some cases. Meanwhile, in the case where the addition amount exceeds 0.02 (2 mass %), the economic efficiency is deteriorated due to the efficiency reduction in some cases, and the effect to impart flame retardancy is also saturated, which reduces the efficiency in some cases.

2-7. Method of Producing Transparent Resin Composition

The transparent resin composition according to the first embodiment of the present technology can be produced as follows. First, for example, components (an aromatic polycarbonate resin, a water-insoluble organic sulfonic acid and/or a metal salt thereof, a light diffusing agent, a drip preventing agent, and other components described above as necessary) are mixed. In each component, the above-mentioned silicone compound may be contained. At this time, it is substantially uniformly dispersed by using, for example, a Henschel mixer or a tumbler. After that, the strand obtained when performing melt-kneading by a single screw or twin screw extruder or the like is cut with a pelletizer to produce pellets.

The transparent resin composition according to the first embodiment of the present technology can be produced as described above. Note that the transparent resin composition according to the first embodiment of the present technology is not limited to those processed into pellets, and includes those in the state in which the components are mixed (powder state or fluid state) and those processed into a form (sheet form or the like) different from the pellet.

3. Second Embodiment (Example of Transparent Resin Molded Article)

3-1. Transparent Resin Molded Article

A transparent resin molded article according to a second embodiment of the present technology is a resin molded article obtained by molding the transparent resin composition according to the first embodiment of the present technology. The transparent resin molded article according to the second embodiment of the present technology is favorably a cover for lighting apparatus, and favorably a diffusing cover for lighting apparatus for display.

3-2. Method of Producing Transparent Resin Molded Article

The transparent resin molded article according to the second embodiment of the present technology can be produced as follows, for example. The above-mentioned pellets or the like may be molded by using various methods such as injection molding, injection compression molding, extrusion molding, blow molding, vacuum molding, press molding, foam molding, and supercritical molding into a predetermined shape (e.g., housing or part material of various kinds of products such as electric appliances, an automobile, information equipment, office equipment, telephone, stationery, furniture, and fiber) to obtain a transparent resin molded article.

The present technology is not limited only to the embodiments and various modifications can be made without departing from the essence of the present technology.

Note that the effects described herein are merely examples and are not limited, and additional effects may be exerted.

Further, the present technology may take the following configurations.

[1] A transparent resin composition, including:
an aromatic polycarbonate resin; and
a water-insoluble organic sulfonic acid and/or a metal salt thereof, in which
a content of the water-insoluble organic sulfonic acid and/or the metal salt thereof is 0.01 to 3.0 pts·mass to 100 pts·mass of the aromatic polycarbonate resin, and
a dissolved amount of the water-insoluble organic sulfonic acid and/or the metal salt thereof is not more than 0.5 g to 100 g of pure water.

[2] The transparent resin composition according to [1], in which
a rate of decrease of a total light transmittance of the transparent resin composition after an acceleration test under a condition of 120° C., 100%, and 24 hours is within 10% to a total light transmittance of the transparent resin composition before the acceleration test.

[3] The transparent resin composition according to [1] or [2], in which
a weight-average molecular weight of the aromatic polycarbonate resin in terms of polystyrene is 36,000 or more and 63,000 or less.

[4] The transparent resin composition according to any one of [1] to [3], in which
the metal salt of the water-insoluble organic sulfonic acid includes an aromatic sulfonic acid metal salt compound.

[5] The transparent resin composition according to [4], in which
a weight-average molecular weight of the aromatic sulfonic acid metal salt compound in terms of polystyrene is not less than 30,000.

[6] The transparent resin composition according to [4] or [5], in which
the aromatic sulfonic acid metal salt compound includes a sulfonic acid metal base, and a content of the sulfonic acid metal base is 0.1 to 10 mol %.

[7] The transparent resin composition according to any one of [1] to [6], in which
the aromatic polycarbonate resin includes a recovered polycarbonate resin, and
a content of the recovered polycarbonate resin is from 1 to less than 100 mass % to the total mass of the aromatic polycarbonate resin.

[8] The transparent resin composition according to any one of [1] to [6], in which
the aromatic polycarbonate resin includes a recovered polycarbonate resin.

[9] The transparent resin composition according to any one of [1] to [8], in which
the aromatic polycarbonate resin includes an aromatic polycarbonate compound having 0.01 to 3.0 mol % branch structure.

[10] The transparent resin composition according to any one of [1] to [9], in which
the aromatic polycarbonate resin includes an aromatic polycarbonate-polyorganosiloxane copolymer.

[11] The transparent resin composition according to any one of [1] to [10], further including
a light diffusing agent.

[12] The transparent resin composition according to [11], in which
the light diffusing agent is an inorganic particle or an organic particle, and an average particle diameter of the inorganic particle or the organic particle is 0.1 to 50 µm.

[13] The transparent resin composition according to [11] or [12], in which
a rate of decrease of a total light transmittance of the transparent resin composition after an acceleration test under a condition of 120° C., 100%, and 24 hours is within 10% to a total light transmittance of the transparent resin composition before the acceleration test.

[14] The transparent resin composition according to any one of [11] to [13], in which
a content of the light diffusing agent is 0.0005 to 6.0 pts·mass to 100 pts·mass of the aromatic polycarbonate resin.

[15] The transparent resin composition according to any one of [1] to [14], further including
a drip preventing agent, in which
a content of the drip preventing agent is not more than 0.03 pts·mass to 100 pts·mass of the aromatic polycarbonate resin.

[16] A transparent resin molded article,
that is obtained by molding the transparent resin composition according to any one of [1] to [15].

[17] The transparent resin molded article according to [16],
that is a cover for lighting apparatus.

[18] The transparent resin molded article according to [16],
that is a diffusing cover for lighting apparatus for display.

EXAMPLES

Hereinafter, the effects of the present technology will be specifically described with Examples. Note that the scope of the present technology is not limited to Examples.

Transparent resin compositions according to Examples 1-1 to 1-8 and Examples 2-1 to 2-11 and resin compositions according to Comparative Examples 1-1 to 1-6 and Comparative Examples 2-1 to 2-6 were prepared, and each of the transparent resin compositions and each of the resin compositions were evaluated. The composition (pts·mass) of each of the transparent resin compositions according to Examples 1-1 to 1-8 and evaluation results of total light transmittance (%), haze (%), flame retardancy, and durability thereof are shown in the following Table 1. The composition (pts·mass) of each of the resin composition according to Comparative Examples 1-1 to 1-6 and evaluation results of total light transmittance (%), haze (%), flame retardancy, and durability thereof are shown in the following Table 2. The composition (pts·mass) of each of the transparent resin compositions according to Examples 2-1 to 2-11 and evaluation results of total light transmittance (%), haze (%), flame retardancy, and durability thereof are shown in the following Table 3. The composition (pts·mass) of each of the resin compositions according to Comparative Examples 2-1 to 2-6 and evaluation results of total light transmittance (%), haze (%), flame retardancy, and durability are shown in the following Table 4.

Transparent Resin Compositions According to Examples 1-1 to 1-8 and Examples 2-1 to 2-11, and Resin Compositions According to Comparative Examples 1-1 to 1-6 and 2-1 to 2-6

Each component contained in the transparent resin compositions according to Examples 1-1 to 1-8 and Examples 2-1 to 2-11 and resin compositions according to Comparative Examples 1-1 to 1-6 and 2-1 to 2-6 will be described. Note that the components (A component, B component, C component, and D component) respectively correspond to the aromatic polycarbonate resin, the water-insoluble organic sulfonic acid and/or the metal salt thereof, the light diffusing agent, and the drip preventing agent described in the above-mentioned first embodiment.

(A Component: Aromatic Polycarbonate Resin)

As an aromatic polycarbonate resin, which is an A component, the following components A-1 to A-4 were used.

A-1: commercially available PC resin having a medium molecular weight (L-1225L: chemical manufactured by TEIJIN LIMITED, Mw in terms of PS is 45,000).

A-2: commercially available PC resin having a low molecular weight (L-1225LLL: chemical manufactured by TEIJIN LIMITED, Mw in terms of PS is 33,000).

A-3: PC resin (Mw in terms of PS: 46,000) pelletized after pulverizing a used building material sheet coarsely and then melt-kneading it by a twin screw extruder.

A-4: pelletized PC resin (Mw in terms of PS: 32,000) obtained by treating a used CD, which has been pulverized (2 to 20 mm), with an alkaline hot aqueous solution to remove a coating layer (a recording material layer, a label, an adhesive layer, a hardened layer, a metallic reflective layer, and the like), and then melt-kneading it by a twin screw extruder.

(B Component: Water-Insoluble Organic Sulfonic Acid and/or Metal Salt thereof)

As a water-insoluble organic sulfonic acid and/or a metal salt thereof, which is a B component, the following component B-1 was used.

B-1: water-insoluble polymer-type flame retardant, one obtained by introducing a potassium salt of a sulfonic acid into the surface of polystyrene (manufactured by Sony Corp.: PSS-K). A dissolved amount (solubility): 0.11 g/100 g of pure water.

The dissolved amount (solubility) was calculated by mixing 3 g of the component B-1 with 100 g of pure water, stirring for 30 minutes, and then filtering it with 0.5 μm filter to measure the insoluble matter.

(b Component: Water-Soluble Flame Retardant)

Further, as a water-soluble flame retardant, which is a b component, the following components b-1 to b-2 were used.

b-2: water-soluble flame retardant, commercially available potassium perfluorobutanesulfonate (manufactured by Tokyo Chemical Industry Co., Ltd.: Potassium Nonafluoro-1-butanesulfonate). A dissolved amount (solubility): 4.6 g/100 g of pure water.

b-3: water-soluble flame retardant, commercially available sodium paratoluenesulfonic acid, (manufactured by FUJIFILM Wako Pure Chemical Corporation: p-Toluenesulfonic Acid Sodium Salt). A dissolved amount (solubility): 24.0 g/100 g of pure water.

The dissolved amount (solubility) was calculated by mixing 25 g of the component b-1 or b-2 with 100 g of pure water, stirring for 30 minutes, and then filtering it with 0.5 μm filter to measure the insoluble matter.

(C Component: Light Diffusing Agent)

As a light diffusing agent, which is a C component, the following component C-1 was used.

C-1: crosslinked (meth) acrylic polymer particle (manufactured by SEKISUI PLASTICS CO., LTD.: TECH-POLYMER MBX-5).

(D Component: Drip Preventing Agent)

As a drip preventing agent, which is a D component, the following component D-1 was used.

D-1: commercially available PTFE (manufactured by DAIKIN INDUSTRIES, LTD.: POLYFLON FA500H) as polytetrafluoroethylene having fibril-forming ability Molding of Transparent Resin Compositions According to Examples 1-1 to 1-8 and Examples 2-1 to 2-11 and Resin Compositions According to Comparative Examples 1-1 to 1-6 and 2-1 to 2-6

The above-mentioned various components (components A-1 to A-4, component B-1, components b-1 to b-2, component C-1, and component D-1) were blended at a formulation ratio shown in the following Table 1 (Examples 1-1 to Examples 1-8), Table 2 (Comparative Examples 1-1 to Comparative Examples 1-6), Table 3 (Examples 2-1 to Examples 2-11), and Table 4 (Comparative Examples 2-1 to Comparative Examples 2-6), blended with a tumbler, and melt-kneaded using a co-rotating twin screw kneading extruder (manufactured by LABO PLASTMILL, using a twin screw extrusion unit) to obtain pellets (a transparent resin composition and a resin composition). The extrusion condition was the discharge rate of 4 kg/h, the screw rotation rate was 48 rpm, and the extrusion temperature was 270° C. from the first supply port to the die portion. The obtained pellets were dried at 120° C. for eight hours by a hot air circulation drier, and molded using an injection molding machine at a cylinder temperature of 290° C. and a mold temperature of 70° C. to prepare a specimen for optical measurement and a specimen for measuring flame retardancy.

Next, in accordance with the following test method, the specimen for optical measurement and the specimen for measuring flame retardancy prepared above were used for evaluating the total light transmittance (%), haze (%), the flame retardancy, and durability.

[Test Method for Total Light Transmittance]

Using a haze meter NDH2000 (manufactured by NIPPON DENSHOKU INDUSTRIES Co., LTD.), the total light transmittance was measured in accordance with JIS K 7136 for a flat plate specimen having a thickness of 1.0 mm.

[Test Method for Haze]

Using a haze meter NDH2000 (manufactured by NIPPON DENSHOKU INDUSTRIES Co., LTD.), the haze was measured in accordance with JIS K 7136 for a flat plate specimen having a thickness of 1.0 mm.

[Test Method for Flame Retardancy]

Combustion tests in accordance with UL standard 94 were performed with a thickness of 1.6 mm, the grades thereof were evaluated, and it was determined that not less than V-1 were good. The UL94V standard and determination criteria are shown in the following Table 5.

[Test Method for Durability]

Using the value of total light transmittance obtained by causing the molded article (specimen for optical measurement) obtained in the above to stand under high temperature and high humidity conditions of 120° C. and 100% RH to accelerate degradation, evaluation was performed. In the case where the total light transmittance after the acceleration test maintains not less than 75% that represents the transparency, it is determined as good (indicated by a circle).

The results of Examples 1-1 to 1-8, the results of Comparative Examples 1-1 to 1-6, the results of Examples 2-1 to 2-11, and the results of Comparative Examples 1-1 to 1-6 and 2-1 to 2-6 are respectively shown in the following Table 1, Table 2, Table 3, and Table 4.

As is clear from Examples 1-1 to 1-8 shown in Table 1 and Examples 2-1 to 2-11 shown in Table 3, it was confirmed that the transparent resin compositions according to Examples 1-1 to 1-8 shown in Table 1 and the transparent resin compositions according to Examples 2-1 to 2-11 shown in Table 3 had excellent flame retardancy and durability as compared with the existing flame retardant polycarbonate resin composition, the resin compositions according to Comparative Examples 1-1 to 1-6 shown in Table 2, and the resin compositions according to Comparative Examples 2-1 to 2-6. Further, it is considerable that the transparent resin composition according to the present technology is compatible with a thin molded article and is a flame retardant resin composition having excellent flame retardancy, moldability, flexural modulus, and durability as compared with the existing flame retardant polycarbonate resin composition.

Note that the results of Comparative Examples are shown in the following.

Comparative Examples 1-1 and Comparative Examples 2-1

As a result of durability test, the total light transmittance was significantly reduced in the case where the water-soluble flame retardant (b-2) was used.

Comparative Examples 1-2 and Comparative Examples 2-2

As a result of durability test, the total light transmittance was significantly reduced in the case where the water-soluble flame retardant (b-3) was used.

Comparative Examples 1-3 and 1-4, and Comparative Examples 2-3 and 2-4

Regardless of the content of PTFE (D-1: drip preventing agent), the total light transmittance was significantly reduced in the case where the water-soluble flame retardant (b-2) was used.

Comparative Examples 1-5 and 1-6, and Comparative Examples 2-5 and 2-6

Regardless of the presence or absence of the recovered polycarbonate resin (A-3), the degree of reduction in total light transmittance was unchanged.

TABLE 1

|  |  | Example 1-1 | Example 1-2 | Example 1-3 | Example 1-4 | Example 1-5 | Example 1-6 | Example 1-7 | Example 1-8 |
|---|---|---|---|---|---|---|---|---|---|
| [A component] Aromatic polycarbonate resin | A-1 | 100 |  |  |  | 50 | 50 | 100 | 100 |
|  | A-2 |  | 100 |  |  |  |  |  |  |
|  | A-3 |  |  | 100 |  | 50 |  |  |  |
|  | A-4 |  |  |  | 100 |  | 50 |  |  |
|  | <Arithmetic mean of weight-average molecular weight (in terms of PS)> | 45000 | 33000 | 46000 | 32000 | 45300 | 38900 | 45000 | 45000 |
| [B component] Water-insoluble organic sulfonic acid and/or metal salt thereof | B-1 | 0.1 | 0.1 | 0.1 | 0.1 | 0.1 | 0.1 | 0.1 | 0.1 |
| Water-soluble flame retardant | b-2 |  |  |  |  |  |  |  |  |
|  | b-3 |  |  |  |  |  |  |  |  |
| [D component] Drip preventing agent | D-1 |  |  |  |  |  |  | 0.01 | 0.03 |
| [Evaluation item] | Total light transmittance [%] | 89 | 89.3 | 88.7 | 88.2 | 88.9 | 88.8 | 86.8 | 83.2 |
|  | Haze [%] | 12.8 | 13.1 | 13.4 | 13.3 | 13 | 13.1 | 15.2 | 18.1 |
|  | Flame retardancy (UL94V), thickness 1.6 mm | V-0 | V-0 | V-0 | V-0 | V-0 | V-0 | V-0 | V-0 |
|  | Durability | ○ (81.9%) | ○ (82.2%) | ○ (81.7%) | ○ (81.2%) | ○ (82.1%) | ○ (81.5%) | ○ (79.5%) | ○ (76.0%) |

TABLE 2

|  |  | Comparison example 1-1 | Comparison example 1-2 | Comparison example 1-3 | Comparison example 1-4 | Comparison example 1-5 | Comparison example 1-6 |
|---|---|---|---|---|---|---|---|
| [A component] Aromatic polycarbonate resin | A-1 | 100 | 100 | 100 | 100 | 50 | 50 |
|  | A-2 |  |  |  |  |  |  |
|  | A-3 |  |  |  |  | 50 | 50 |
|  | A-4 |  |  |  |  |  |  |
|  | <Arithmetic mean of weight-average molecular weight (in terms of PS)> | 45000 | 45000 | 45000 | 45000 | 45300 | 38900 |
| [B component] Water-insoluble organic sulfonic acid and/or metal salt thereof | B-1 |  |  |  |  |  |  |
| Water-soluble flame retardant | b-2 | 0.1 |  | 0.1 | 0.1 | 0.1 |  |
|  | b-3 |  | 0.1 |  |  |  | 0.1 |

TABLE 2-continued

|  |  | Comparison example1-1 | Comparison example 1-2 | Comparison example 1-3 | Comparison example 1-4 | Comparison example 1-5 | Comparison example 1-6 |
| --- | --- | --- | --- | --- | --- | --- | --- |
| [D component] Drip preventing agent | D-1 |  |  |  | 0.01 | 0.03 |  |
| [Evaluation item] | Total light transmittance [%] | 88.5 | 88.8 | 86.5 | 84.1 | 88.3 | 88.3 |
|  | Haze [%] | 12.6 | 12.9 | 15.5 | 17.8 | 12.5 | 12.2 |
|  | Flame retardancy (UL94V), thickness 1.6 mm | V-0 | V-0 | V-0 | V-0 | V-0 | V-0 |
|  | Durability | x (52.2%) | x (55.3%) | x (49.6%) | x (47.1%) | x (52.8%) | x (55.6%) |

TABLE 3

|  |  | Example2-1 | Example2-2 | Example2-3 | Example2-4 | Example2-5 | Example2-6 | Example2-7 | Example2-8 | Example2-9 | Example2-10 | Example2-11 |
| --- | --- | --- | --- | --- | --- | --- | --- | --- | --- | --- | --- | --- |
| [A component] Aromatic polycarbonate resin | A-1 | 100 |  |  |  | 50 | 50 | 100 | 100 | 100 | 100 | 100 |
|  | A-2 |  | 100 |  |  |  |  |  |  |  |  |  |
|  | A-3 |  |  | 100 |  | 50 |  |  |  |  |  |  |
|  | A-4 |  |  |  | 100 |  | 50 |  |  |  |  |  |
|  | <Arithmetic mean of weight-average molecular weight (in terms of PS)> | 45000 | 33000 | 46000 | 32000 | 45300 | 38900 | 45000 | 45000 | 45000 | 45000 | 45000 |
| [B component] Water-insoluble organic sulfonic acid and/or metal salt thereof | B-1 | 0.1 | 0.1 | 0.1 | 0.1 | 0.1 | 0.1 | 0.1 | 0.1 | 0.1 | 0.1 | 0.1 |
| Water-soluble flame retardant | b-2 |  |  |  |  |  |  |  |  |  |  |  |
|  | b-3 |  |  |  |  |  |  |  |  |  |  |  |
| [C component] Light diffusing agent | C-1 | 0.1 | 0.1 | 0.1 | 0.1 | 0.1 | 0.1 | 0.1 | 0.1 |  |  |  |
|  | C-2 |  |  |  |  |  |  |  |  | 0.1 | 0.1 | 0.1 |
| [D component] Drip preventing agent | D-1 |  |  |  |  |  |  | 0.01 | 0.03 |  | 0.01 | 0.03 |
| [Evaluation item] | Total light transmittance [%] | 86.1 | 86.3 | 85.8 | 85.7 | 85.9 | 86 | 83.8 | 80.3 | 87.8 | 84.3 | 82.2 |
|  | Haze [%] | 93.3 | 93.2 | 93.9 | 93.8 | 93.5 | 93.4 | 93.9 | 95.2 | 92.4 | 92.8 | 94.4 |
|  | Flame retardancy (UL94V), thickness 1.6 mm | V-0 | V-0 | V-0 | V-0 | V-0 | V-0 | V-0 | V-0 | V-0 | V-0 | V-0 |
|  | Durability | ○ (78.8%) | ○ (79.2%) | ○ (78.3%) | ○ (78.4%) | ○ (78.8%) | ○ (78.9%) | ○ (77.2%) | ○ (75.2%) | ○ (79.1%) | ○ (77.3%) | ○ (75.1%) |

TABLE 4

|  |  | Comparison example2-1 | Comparison example 2-2 | Comparison example 2-3 | Comparison example 2-4 | Comparison example 2-5 | Comparison example 2-6 |
| --- | --- | --- | --- | --- | --- | --- | --- |
| [A component] Aromatic polycarbonate resin | A-1 |  | 100 | 100 | 100 | 100 | 50 | 50 |
|  | A-2 |  |  |  |  |  |  |  |
|  | A-3 |  |  |  |  |  | 50 | 50 |
|  | A-4 |  |  |  |  |  |  |  |
|  | <Arithmetic mean of weight-average molecular weight (in terms of PS)> | 45000 | 45000 | 45000 | 45000 | 45300 | 38900 |

TABLE 4-continued

|  |  | Comparison example 2-1 | Comparison example 2-2 | Comparison example 2-3 | Comparison example 2-4 | Comparison example 2-5 | Comparison example 2-6 |
|---|---|---|---|---|---|---|---|
| [B component] Water-insoluble organic sulfonic acid and/or metal salt thereof | B-1 |  |  |  |  |  |  |
| Water-soluble flame retardant | b-2 | 0.1 |  | 0.1 | 0.1 | 0.1 |  |
|  | b-3 |  | 0.1 |  |  |  | 0.1 |
| [C component] Light diffusing agent | C-1 | 0.1 | 0.1 | 0.1 | 0.1 | 0.1 | 0.1 |
|  | C-2 |  |  |  |  |  |  |
| [D component] Drip preventing agent | D-1 |  |  | 0.01 | 0.03 |  |  |
| [Evaluation item] | Total light transmittance [%] | 86.8 | 86.7 | 84.1 | 80.9 | 85.5 | 85.2 |
|  | Haze[%] | 92.9 | 93.1 | 93.7 | 94.9 | 93.6 | 93.3 |
|  | Flame retardancy (UL94V), thickness 1.6 mm | V-0 | V-0 | V-0 | V-0 | V-0 | V-0 |
|  | Durability | x (51.4%) | x (53.5%) | x (48.7%) | x (46.3%) | x (52.2%) | x (53.9%) |

TABLE 5

| UL94V standard and determination criteria | | | | |
|---|---|---|---|---|
| Determination criteria | Class category | V-0 | V-1 | V-2 |
|  | Combustion time after first contact with flame (S) | ≤10 | ≤30 | ≤30 |
|  | Combustion time after second contact with flame (S) | ≤10 | ≤30 | ≤30 |
|  | Total combustion time of five components | ≤50 | ≤250 | ≤250 |
|  | Combustion time of each specimen + glowing time (S) | ≤30 | ≤60 | ≤60 |
|  | Combustion reaches damp | No | No | No |
|  | Cotton ignites by dropping | No | No | Yes |

The invention claimed is:

1. A transparent resin composition, comprising:
an aromatic polycarbonate resin; and
a water-insoluble organic sulfonic acid and/or a metal salt thereof; wherein
a content of the water-insoluble organic sulfonic acid and/or the metal salt thereof is 0.01 to 3.0 pts·mass to 100 pts·mass of the aromatic polycarbonate resin,
solubility of the water-insoluble organic sulfonic acid and/or the metal salt thereof is 0.5 g or less in 100 g of pure water,
a total light transmittance of the transparent resin composition is at least 75% at a wavelength of 380 to 730 nm in accordance with JIS K7136, and
a decrease of a total light transmittance of the transparent resin composition after an acceleration test under a condition of 120° C., 100% relative humidity, and 24 hours is within 8% of a total light transmittance of the transparent resin composition before the acceleration test; and
wherein the composition does not comprise a silicone flame retardant or a perfluoroalkanesulfonic acid, or alkali metal salt or alkaline earth metal salt thereof.

2. The transparent resin composition according to claim 1, wherein a weight-average molecular weight of the aromatic polycarbonate resin in terms of polystyrene is between 36,000 and 63,000.

3. The transparent resin composition according to claim 1, wherein the aromatic polycarbonate resin includes a recovered polycarbonate resin, and a content of the recovered polycarbonate resin is from 1 to less than 100 mass % to the total mass of the aromatic polycarbonate resin.

4. The transparent resin composition according to claim 1, wherein the aromatic polycarbonate resin includes a recovered polycarbonate resin.

5. The transparent resin composition according to claim 1, wherein the aromatic polycarbonate resin includes an aromatic polycarbonate compound having 0.01 to 3.0 mol % branch structure.

6. The transparent resin composition according to claim 1, wherein the aromatic polycarbonate resin includes an aromatic polycarbonate-polyorganosiloxane copolymer.

7. The transparent resin composition according to claim 1, wherein the water-insoluble organic sulfonic acid is a metal salt of the water-insoluble organic sulfonic acid that includes an aromatic sulfonic acid metal salt compound.

8. The transparent resin composition according to claim 7, wherein a weight-average molecular weight of the aromatic sulfonic acid metal salt compound in terms of polystyrene is at least 30,000.

9. The transparent resin composition according to claim 7, wherein the aromatic sulfonic acid metal salt compound comprises a sulfonic acid metal base, and wherein a content of the sulfonic acid metal base is 0.1 to 10 mol %.

10. The transparent resin composition according to claim 7, wherein the aromatic sulfonic acid metal salt compound is a potassium salt of polystyrene sulfonic acid.

11. The transparent resin composition according to claim 1, further comprising a light diffusing agent.

12. The transparent resin composition according to claim 11, wherein the light diffusing agent is an inorganic particle or an organic particle, and an average particle diameter of the inorganic particle or the organic particle is 0.1 to 50 μm.

13. The transparent resin composition according to claim 11, wherein a content of the light diffusing agent is 0.0005 to 6.0 pts·mass to 100 pts·mass of the aromatic polycarbonate resin.

14. The transparent resin composition according to claim 1, further comprising a drip preventing agent, wherein a content of the drip preventing agent is not more than 0.03 pts·mass to 100 pts·mass of the aromatic polycarbonate resin.

15. The transparent resin composition according to claim 1, wherein the total light transmittance of the transparent resin composition is not less than 85% at a wavelength of 380 to 730 nm in accordance with JIS K7136.

16. A transparent resin molded article that is obtained by molding the transparent resin composition according to claim 1.

17. The transparent resin molded article according to claim 16 that is a cover for lighting apparatus or a diffusing cover for lighting apparatus for display.

18. A transparent resin composition, comprising:
an aromatic polycarbonate resin; and
a water-insoluble organic sulfonic acid and/or a metal salt thereof; wherein
a content of the water-insoluble organic sulfonic acid and/or the metal salt thereof is 0.01 to 3.0 pts·mass to 100 pts·mass of the aromatic polycarbonate resin, and
solubility of the water-insoluble organic sulfonic acid and/or the metal salt thereof is 0.5 g or less in 100 g of pure water; and
wherein the composition does not comprise a silicone flame retardant or a perfluoroalkanesulfonic acid, or alkali metal salt or alkaline earth metal salt thereof.

19. The transparent resin composition according to claim 1, wherein the metal salt of the water-insoluble organic sulfonic acid is obtained by introducing a potassium salt of a sulfonic acid into the surface of polystyrene (PSS-K).

20. The transparent resin composition according to claim 1, wherein the aromatic sulfonic acid metal salt is potassium polystyrene sulfonate.

21. The transparent resin composition according to claim 1, wherein the water-insoluble organic sulfonic acid is a high impact polystyrene sulfonic acid, or a metal salt thereof.

22. The transparent resin composition according to claim 18, wherein the water-insoluble organic sulfonic acid does not comprise a styrene-acrylonitrile copolymer.

* * * * *